Dec. 5, 1939.  E. FLADMARK  2,182,428
METHOD OF RECOVERING THE SOLIDS FROM PULP MILL WASTE LIQUORS
Filed Nov. 11, 1935
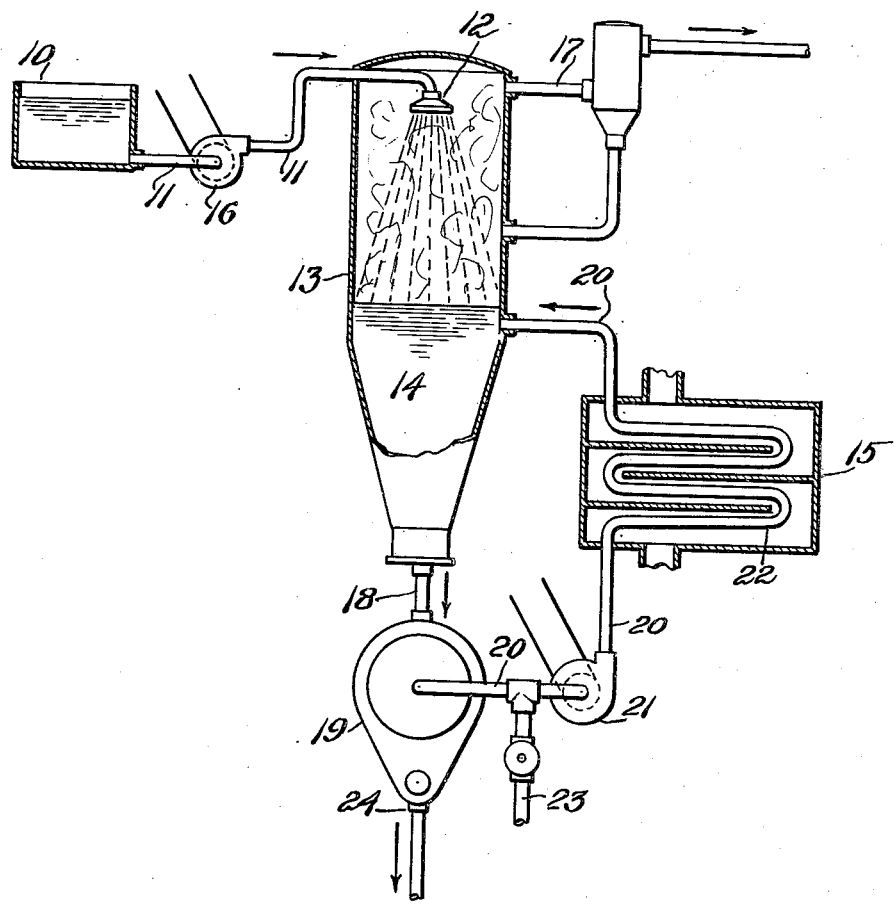
Inventor=
Erling Fladmark,
By Arthur L. Randall
Atty.

Patented Dec. 5, 1939

2,182,428

UNITED STATES PATENT OFFICE 2,182,428

METHOD OF RECOVERING THE SOLIDS FROM PULP MILL WASTE LIQUORS

Erling Fladmark, Lawrence, Mass.

Application November 11, 1935, Serial No. 49,248

1 Claim. (Cl. 159—48)

This invention relates to the evaporation of liquids containing solids in solution and/or suspension for the purpose of separating the former from the latter, and it has for its object to provide a commercial process for economically and expeditiously separating and segregating the solids and the liquids through evaporation of the latter.

It is also the object of this invention to effect the evaporation of water containing a solid or solids in solution and/or suspension so that said water is continuously converted into steam while all of the solid matter is simultaneously and continuously separated from the water and steam in a bone dry, or nearly bone dry condition. By the expression "bone dry" I mean the total absence of water irrespective of any other physical condition or characteristic of the solid matter.

It is also one of the objects of this invention to recover the solids from industrial waste liquors under such conditions that all of the water in such waste liquors is separated therefrom, while the solids are simultaneously recovered in a practically bone dry condition.

An example is pulpmill waste liquors. In the operation of pulp mills there are large quantities of waste liquors to be disposed of which contain about ten per cent useful organic and inorganic compounds in solution. In the pulping processes known as the sulphate process and the soda process these liquors are evaporated and incinerated in order to recover the valuable sodium salts which they contain.

The waste liquor from the pulping process known as the sulphite process does not contain any such valuable salts and therefore the disposal of this liquor by evaporation and incineration has not heretofore been economical but, on the contrary, a matter of expense and was resorted to merely as a means of disposal in localities where legislation prohibits the dumping of large quantities of waste liquors into rivers or other waters. It is one of the objects of this invention to provide an economical and profitable method of recovering the solids from waste liquor of this kind.

The evaporation of the waste liquors above referred to has heretofore commonly been carried out in multiple effect evaporators under comparatively low pressure and owing to the high viscosity of the concentrated waste liquors the maximum concentration obtainable was only in the neighborhood of fifty or sixty percent.

Another difficulty, particularly troublesome when sulphite waste liquor is evaporated, is the incrustation of the heater tubes by inorganic salts crystalizing from the solution and causing rapidly decreasing efficiency of heat transfer. The high dilution of these liquors has also been a difficulty in the recovery of their solids and it is an object of this invention to overcome these difficulties.

The accompanying drawing is a view, more or less diagrammatic, of one form of apparatus for use in carrying out my new process.

In the drawing 10 designates a storage tank for holding the liquor that is to be evaporated, said tank being made with an outlet at its bottom connected by a pipe conduit 11 with a downwardly directed spray nozzle 12 disposed within, and at the top of, an evaporator 13 whose lower part contains a heat transfer medium 14. In the pipe conduit 11 is arranged a continuously driven pump 16 by which the liquor is pumped from the storage tank to nozzle 12. The heat transfer medium 14 is a liquid, or a solid compound that is liquid at the normal operating temperature. This heat medium may be an oil, tar, pitch, asphalt, wax or other suitable compound, and its function is to transfer heat from a heater 15 to the liquor to be evaporated that is discharged by nozzle 12 and also to remove from the evaporator 13 the solid residue. Any compound that is liquid at the normal operating temperature; that is non-volatile at said temperature, and which does not enter into chemical reactions with the liquor being treated may be used as this heat transfer medium, and it should therefore be understood that I do not intend to limit myself to the few examples given above.

The transfer medium 14 is heated by the heater 15 well above the boiling temperature of the liquid to be evaporated and while I prefer a temperature of 180 degrees C., so that all the water in the solution may be rapidly driven off as steam when the spray hits the top surface of the transfer medium 14, it will be clear that a higher or a lower temperature may be employed so long as all of the water is released as steam while practically nothing of the heat transfer medium 14 is evaporated. This determines the lower temperature limit at or slightly above the boiling point of the solution to be evaporated, and the upper limit at or slightly below the boiling point of the heat transfer medium 14 at the pressure maintained in the apparatus. Within these limits the temperature may be varied as desired.

The steam evolved in the evaporator 13 is drawn off through an outlet pipe 17 for use, said outlet pipe being connected with the upper part of the interior of the evaporator 13.

The conversion of the water of the liquor into steam within the evaporator 13 leaves the solid residue as a suspension in the heat transfer medium.

The bottom of the interior of evaporator 13 is connected by a pipe conduit 18 with the inlet of a separator 19 within which the absorbed or entrained solids are removed from the transfer medium, the latter being returned to the evaporator 13 through a pipe conduit 20 provided with a pump 21 and also with a coil 22 forming part of heater 15. The pump 21 operates to continuously circulate the transfer medium through coil 22, evaporator 13 and separator 19, the latter being constructed with a filter, centrifuge or some other suitable means for removing the solids from the transfer medium.

Heat transfer medium removed with the solids may be returned or replaced within the apparatus through a normally closed inlet conduit 23.

The solid residue isolated by separator 19 is removed from the latter through an outlet 24, and said residue is now practically free from moisture but saturated with heat transfer medium 14. The amount of heat transfer medium found with the solids may be as great as 100% of their weight depending on the method of separation.

It should be understood, of course, that I have hereinabove indicated a separator 19 only as an example of one practical and possible means for removing the solids from the heat transfer medium and that in the broader aspect of the invention this separating operation or step is not essential since the suspension as it comes from the evaporator may find commercial application.

What I claim is:

The method of recovering the solids from pulp mill waste liquors which consists in continuously spraying the liquor against the surface of a body of heated liquid heat transfer medium within an evaporator at such a rate of flow that the water of said waste liquor is evaporated upon contact with said surface before the waste liquor and liquid heat transfer medium can mix while the solid residue of said waste liquor is being continuously absorbed in dry condition by the liquid heat transfer medium and continuously removed from the evaporator with the latter.

ERLING FLADMARK.